May 30, 1961 G. H. HASLEY 2,986,661

MAGNETIC AMPLIFIER CIRCUIT

Filed April 4, 1958 3 Sheets-Sheet 1

WITNESSES:
Bernard R. Gieguez
Myron E. Click

INVENTOR
Gene H. Hasley
BY
F. E. Browder
ATTORNEY

May 30, 1961 G. H. HASLEY 2,986,661

MAGNETIC AMPLIFIER CIRCUIT

Filed April 4, 1958 3 Sheets-Sheet 2

May 30, 1961 G. H. HASLEY 2,986,661

MAGNETIC AMPLIFIER CIRCUIT

Filed April 4, 1958 3 Sheets-Sheet 3

2,986,661
Patented May 30, 1961

2,986,661

MAGNETIC AMPLIFIER CIRCUIT

Gene H. Hasley, Pittsburgh, Pa., assignor to Westinghouse Electric Corporation, East Pittsburgh, Pa., a corporation of Pennsylvania Filed Apr. 4, 1958, Ser. No. 726,443
4 Claims. (Cl. 307—88)

This invention relates to magnetic amplifier circuits in general and in particular to bistable magnetic amplifier circuits.

It is an object of this invention to provide an improved bistable magnetic amplifier circuit.

It is another object of this invention to provide a magnetic amplifier circuit in which bistable or "ON" outputs may be obtained in response to both a high and a low signal input.

It is still another object of this invention to provide an improved magnetic amplifier circuit which provides an output for both a high and and a low level signal and having means for adjusting the deadband, where there is no output, from zero up to some maximum value.

Further objects of this invention will become apparent from the following description when taken in conjunction with the accompanying drawings. In said drawings, for illustrative purpose only, there is shown a preferred embodiment of the invention. The manner in which the windings have been wound upon their associated cores has been denoted in the drawings by the polarity dot convention. That is, current flowing into the polarity dot end of a winding will drive the associated magnetic core toward positive saturation. Current flowing out of the polarity dot end of a winding will drive the associated core away from positive saturation.

Figure 1:
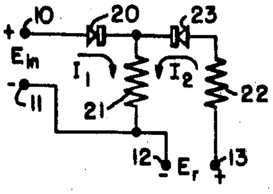
Figure 1 is a schematic diagram of a portion of an input network illustrating the teachings of this invention.

Referring to Fig. 1, there is illustrated a portion of the input circuit to be used in which varying the voltage of the input signal $E_{in}$ indirectly and inversely causes the current $I_2$ to vary.

The voltage $E_{in}$, with polarity as shown, is to be applied to a pair of input terminals 10 and 11. A rectifier 20 and a resistor 21 are connected in series between the terminals 10 and 11. A constant reference voltage $E_r$, with polarity as shown, is to be applied to the terminals 12 and 13. A resistor 22, a rectifier 23 and the resistor 21 are connected in series between the terminals 13 and 12.

For the purposes of discussion only, assume the following fixed values:

$$E_r=50 \text{ volts}$$
$$R_{21}=1000 \text{ ohms}$$
$$R_{22}=1000 \text{ ohms}$$

When $E_{in}=0$, then $I_1=0$, and $I_2$ will equal 25 milliamps. Since the resistors 21 and 22 are equal in value, the reference voltage $E_r$ is divided equally, but only so long as $E_{in}$ is less than 25 volts. For all values of $E_{in}$ less than 25 volts, the voltage across the rectifier 20 is in the reverse direction, and $I_1$ is 0, except for a small leakage current in the reverse direction. For purposes of discussion, this leakage current will be considered to be zero. The voltage across the resistor 22 is constant at 25 volts for all values of $E_{in}$ less than 25 volts.

When $E_{in}$ is greater than 25 volts but less than 50 volts, the polarity of the voltage across the rectifier 20 is in the forward direction, and $I_1$ equals some finite value. The voltage across the resistor 21 is now equal to $E_{in}$, and the total current through the resistor 21 is $E_{in}$ divided by $R_{21}$. As $E_{in}$ increases from 25 to 50 volts, $I_1$ increases proportionally, and $I_2$ decreases inversely proportionally. At the point where $E_{in}=50$, $I_2=0$.

Figure 3:
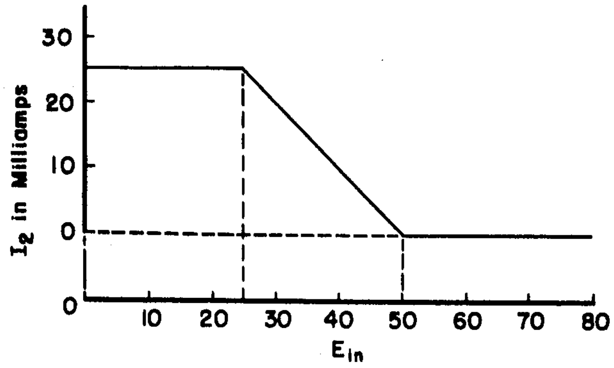
Fig. 3 is a graphical representation of the voltage levels at selected points of the apparatus illustrated in Figs. 1 and 2.

For values of $E_{in}$ greater than 50 volts, the polarity across the rectifier 23 is in the reverse direction. The current $I_2$ through the resistor 22 is equal to zero for values of $E_{in}$ greater than 50 volts. A graphical representation of the characteristic relationship between the input voltage $E_{in}$ and the current through the resistor 22 $I_2$ is shown in Fig. 3. $E_{in}$ will not be considered to be negative, because in a practical application, $E_{in}$ will almost always be of the polarity shown in Fig. 1. However, if $E_{in}$ were of the opposite polarity, the current $I_2$ would remain at 25 milliamps.

Figure 2:
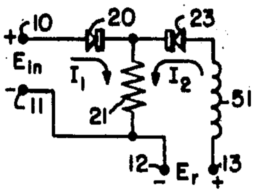
Fig. 2 is a schematic diagram of a portion of an input network illustrating the teachings of this invention.

Referring to Fig. 2, there is illustrated a first portion of an input network which is identical to the apparatus illustrated in Fig. 1 with the exception that the resistor 22 has been replaced with a control winding 51. The control winding 51 will have a definite direct current resistance, and the characteristic of the circuit of Fig. 2 is generally the same as has already been graphically represented in Fig. 3. Different values of the reference voltage $E_r$, the resistor 21, and the resistance of the control winding 51 will change the magnitudes represented in Fig. 3, but the same general logic is applicable.

Figure 4:
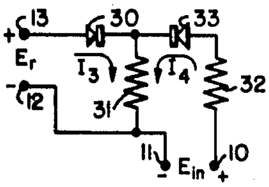
Fig. 4 is a schematic diagram of a second portion of an input network illustrating the teachings of this invention.

Referring to Fig. 4, there is illustrated a second portion of an input network illustrating the teachings of this invention. The constant reference voltage $E_r$ is still applied to the terminals 13 and 12. The input voltage $E_{in}$ is still applied to the terminals 10 and 11. A rectifier 30 and a resistance 31 are connected in series between the terminals 13 and 12. A resistance 32, a rectifier 33 and the resistance 31 are connected in series between the terminals 10 and 11.

Again for the purposes of discussion only, assume the following fixed values:

$$E_r=50 \text{ volts}$$
$$R_{31}=1000 \text{ ohms}$$
$$R_{32}=1000 \text{ ohms}$$

The reference voltage $E_r$ maintains a voltage across the resistor 31 equal to 50 volts for values of the input voltage $E_{in}$ less than 100 volts. The voltage across the resistor 31 will never be less than 50 volts. However, the voltage across the resistor 31 may become greater than 50 volts. For values of the input voltage $E_{in}$ less than 50 volts, the voltage across the rectifier 33 is in the reverse direction because the reference voltage is greater than the input voltage. The current $I_4$ through the resistor 22 is zero for all values of $E_{in}$ less than 50 volts. The current $I_3$ through the rectifier 30 will be equal to 50 milliamps at all times.

Figure 6:
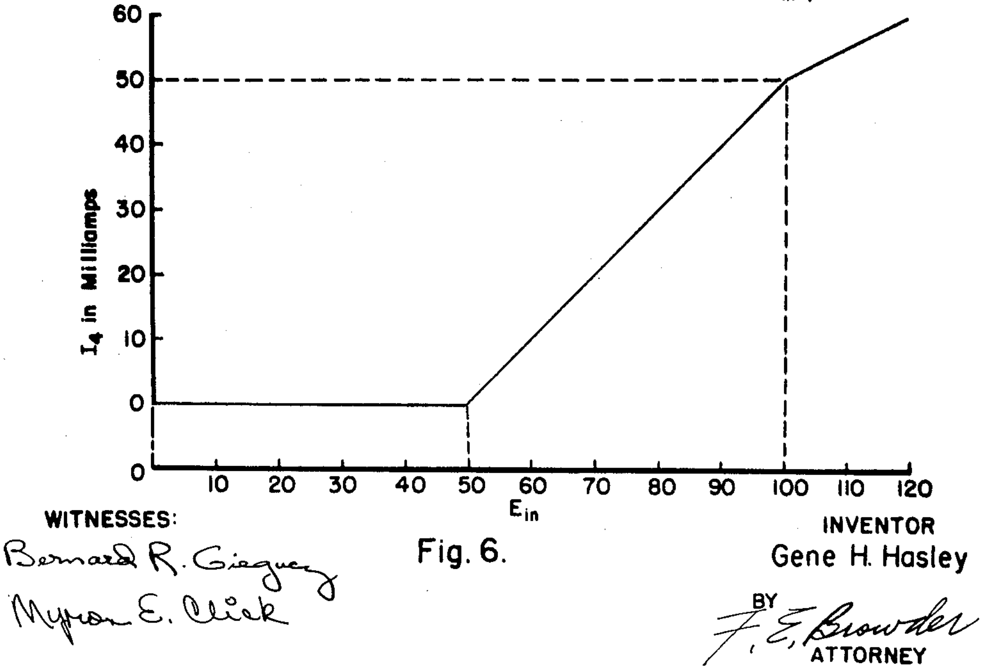
Fig. 6 is a graphical representation of the voltage level at a selected point of the apparatus illustrated in Figs. 4 and 5.

When $E_{in}$ is greater than 50 volts but less than 100 volts, the voltage across the rectifier 33 is in the forward direction. Under this condition the current $I_4$ will be of some value proportional to the input voltage $E_{in}$. This is represented in Fig. 6 by the portion of the graphical characteristic or $E_{in}$ between 50 and 100 volts. As the current $I_4$ increases, the current $I_3$ decreases.

When the input voltage $E_{in}$ is greater than 100 volts, the polarity across the rectifier 30 is in the reverse direction, and the current $I_3$ will be zero. For all values of $E_{in}$ greater than 100 volts, the current $I_4$ would equal the input voltage divided by the sum of the values of the resistances 31 and 32.

Figure 5:
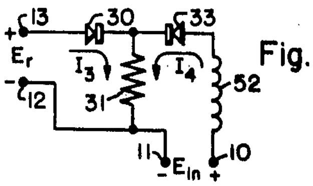
Fig. 5 is a schematic diagram of a modified second portion of an input network illustrating the teachings of this invention.

Referring to Fig. 5, there is illustrated a circuit which is identical with the apparatus illustrated in Fig. 4 with the exception that a control winding 52 has been substituted in place of the resistor 32. The control winding 52 has a direct current resistance so that the same logic applies to Fig. 5 as had applied to Fig. 4, and the same graphical characteristic relationship as shown in Fig. 6 is applicable.

It should be noted that the curves of Fig. 3 and Fig. 6 may be combined without adversely affecting each other. This is true because while the current $I_2$ of Fig. 3 has a finite value, the current $I_4$ of Fig. 6 is zero. Likewise, while the current $I_4$ of Fig. 6 has a finite value, the current $I_2$ of Fig. 3 is zero.

Figure 7:
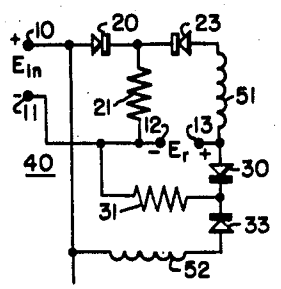
Fig. 7 is a schematic diagram of a complete input network illustrating the teachings of this invention.

Referring to Fig. 7, there is illustrated a complete input network 40 which is the combination of the circuits illustrated in Figs. 2 and 5. Like reference characters applying to like components from Figs. 2 and 5 have been utilized in Fig. 7. Only one input signal $E_{in}$ is required, and only one reference voltage $E_r$ is required.

Figure 8:
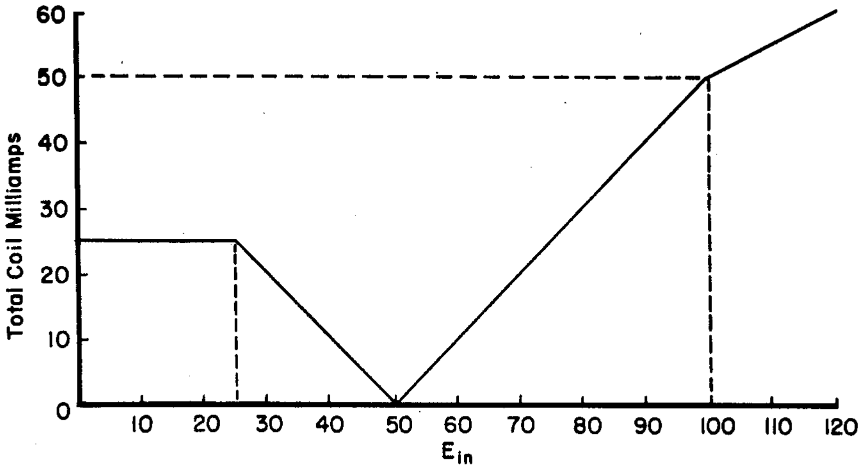
Fig. 8 is a graphical representation of the voltage level at a selected point of the apparatus illustrated in Fig. 7.

Again for the purposes of discussion only, the values for the components are assumed to be the same as the values hereinbefore stated with the exception, of course, that the control windings 51 and 52 are assumed to have the same direct current resistances as the resistances 22 and 32. If the values so stated hereinbefore are assumed for the components of Fig. 7 then the graphical representation of the circuit illustrated in Fig. 7 will be as shown in Fig. 8. As will be noted, the graphical representation in Fig. 8 is merely a combination of the graphical representations in Figs. 3 and 6.

The input circuit 40 may be viewed as an arrangement of biased rectifying means. From such point of view the constant reference voltage $E_r$ biases the rectifying means 23 to forward conduction through the control winding 51. The reference voltage $E_r$ also biases the rectifying means 30 to forward conduction. The input signal $E_{in}$ is applied in a blocking manner to the rectifying means 23 and to the rectifying means 30 through the control winding 52. The rectifiers 20 and 33 function to isolate the input signal from the input network 40. The current in the control winding 51 varies inversely with the magnitude of the input signal $E_{in}$ over a first predetermined range determined by the value of circuit components. The current through the control winding 52 varies in direct proportion to the magnitude of the input signal $E_{in}$ over a second predetermined range also determined by the circuit component values as described hereinbefore.

Figure 9:
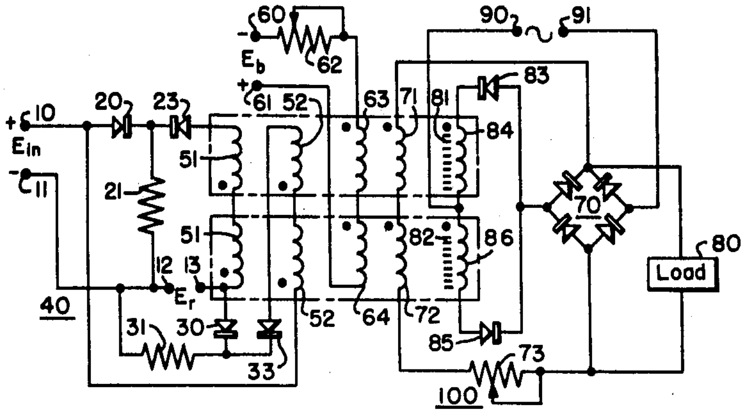
Fig. 9 is a schematic diagram of a bistable magnetic amplifier embodying the teachings of this invention.

Referring to Fig. 9, there is illustrated a bistable magnetic amplifier circuit 100 utilizing the input network 40 discussed hereinbefore. The magnetic amplifier circuit 100 comprises a saturable magnetic core member 81 having inductively disposed thereon a load winding 84, a feedback winding 71, a bias winding 63, a first part of the control winding 52, and a first part of the control winding 51; and a saturable magnetic core member 82 having inductively disposed thereon a load winding 86, a feedback winding 72, a bias winding 64, the remainder of the control winding 52, and the remainder of the control winding 51. The bias windings 63 and 64 are connected in series circuit relationship with a rheostat 62 between a pair of terminals 60 and 61. A bias voltage $E_b$, with polarity as shown, is to be applied to the terminals 60 and 61. The output windings 84 and 86 of the magnetic amplifier 100 are connected in a doubler arrangement through the rectifiers 83 and 85, respectively. The doubler arrangement is connected in series with a means for applying an alternating-current supply, the terminals 90 and 91, to the input of a full-wave rectifier 70. The feedback windings 71 and 72 are connected in series with a rheostat 73 across the output of the full-wave rectifier 70. A load 80 is also connected to the output of the full-wave rectifier 70.

Figure 11:
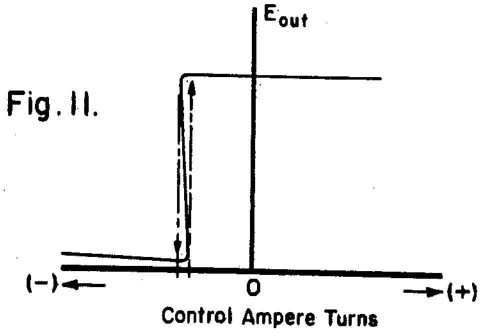
Fig. 11 is a graphical representation of an input-output characteristic of a typical bistable magnetic amplifier.

The magnetic amplifier 100 has a general output-to-input relationship as shown in Fig. 11. The output illustrated in Fig. 11 has two stable conditions, that is, a maximum output and a minimum output which is nearly zero. The magnetic amplifier 100 is typical of a number of magnetic amplifier circuit arrangements which may be utilized to attain the input-output characteristic of Fig. 11. The operation of such a magnetic amplifier 100 is well known in the art and will not be described in detail here.

Changing the bias current by the use of the rheostat 62 has the effect of shifting the entire curve illustrated in Fig. 11 either in a positive or negative direction, depending upon which way the bias current was changed. Thus, by changing the bias current, the control ampere turns, which are required to turn the bistable magnetic amplifier 100 "ON," will be changed. Changing the positive feedback by varying the setting of the rheostat 73 will vary the bandwidth between "ON" operations.

The control windings 51 and 52 are connected as shown and are identical to the input network 40 illustrated in Fig. 7. The magnetic summing of the control winding currents, one of which is always zero, is obtained through the use of the saturable magnetic cores 81 and 82.

Figure 10:
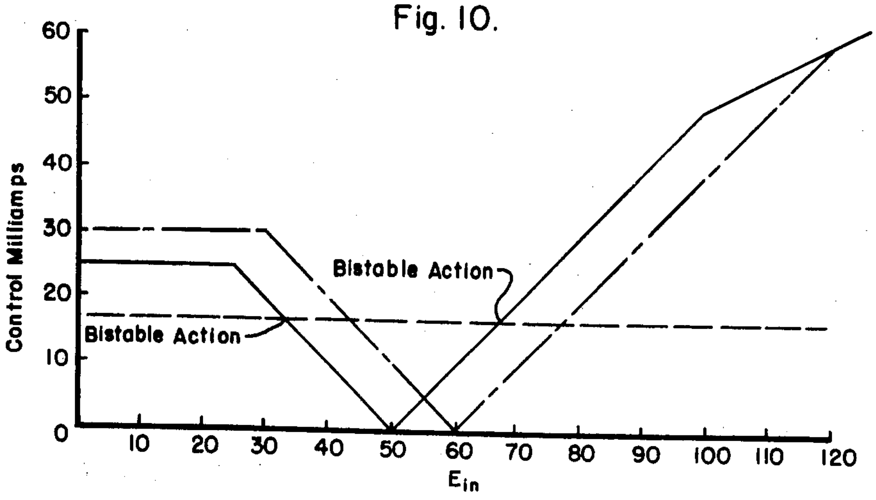
Fig. 10 is a graphical representation of the voltage levels at a selected point of the apparatus illustrated in Fig. 9.

Referring to the graphical representation of Fig. 10 there is illustrated the sum of the currents in the control windings 51 and 52 for the component values previously assumed. The solid line is for a reference voltage $E_r$ of 50 volts and the dashed line as for a reference voltage $E_r$ of 60 volts.

Figure 12:
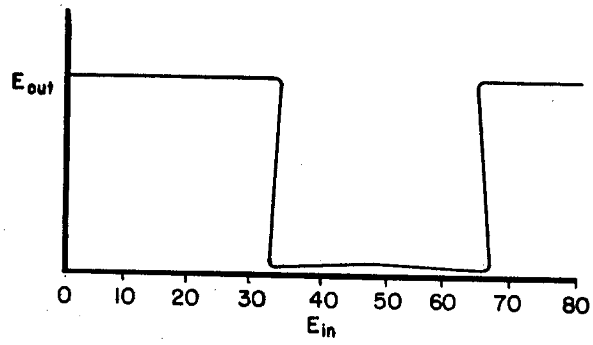
Fig. 12 is a graphical representation of the output of the apparatus illustrated in Fig. 9.

Assume that the bias current is selected such that 17 milliamps are required in the control winding 51 or 52 in order to obtain an output from the magnetic amplifier circuit. Then, with the reference voltage $E_r$ equal to 50 volts, an output from the magnetic amplifier to the load 80 will be obtined for values of the input voltage $E_{in}$ less than 33 volts and also for values greater than approximately 67 volts. This is illustrated in Fig. 12. The deadband "OFF" region is between $E_{in}$ equal to 33 and 67 volts. Thus, the deadband width is in a sense 34 volts.

In order to shift the entire deadband, without changing the width, the reference voltage $E_r$ should be varied. The dashed line in Fig. 10 represents such a change. To change the deadband width, as hereinbefore stated, the bias current should be changed.

In attaining a magnetic amplifier circuit in which bistable action is acquired in response to both a high and low signal input only one magnetic amplifier has been required. Previously, two magnetic amplifiers were required to obtain an output characteristic as illustrated in Fig. 12. The major advantage of this method is in space and weight considerations. An advantage is also shown in that the cost of the apparatus for obtaining a like function is considerably lower.

In conclusion, it is pointed out that while the illustrated examples constitute practical embodiments of my invention, I do not limit myself to the exact detail shown, since modification of the same may be gained without varying from the spirit and scope of this invention.

I claim as my invention:

1. In a bistable circuit, in combination; a magnetic amplifier having a plurality of control windings inductively disposed upon at least one saturable magnetic core; means for biasing said magnetic amplifier to a desired output level; said magnetic amplifier having a bistable input-output characteristic; and an input network for said magnetic amplifier comprising first and second rectifying means, a constant reference voltage connected to bias said first rectifying means through a first control winding, said constant reference voltage being also connected to bias said second rectifying means, and means for applying a blocking input signal through isolating rectifier means to said second rectifying means through a second control winding and to said first rectifying means.

2. In a bistable circuit, in combination; a magnetic amplifier having a plurality of control windings inductively disposed upon at least one saturable magnetic core; means for biasing said magnetic amplifier to a desired output level; said magnetic amplifier having a bistable input-output characteristic; and an input network for said magnetic amplifier comprising first and second rectifying means, a constant reference voltage connected to bias said first rectifying means to forward conduction through a first control winding, said constant reference voltage also being connected to bias said second rectifying means to forward conduction, and means for applying a blocking input signal through isolating rectifier means to said second rectifying means through a second control winding and to said first rectifying means through a second control winding; the magnitude of the current through said first control winding varying inversely in proportion to the magnitude of the input signal over a first predetermined range; the magnitude of the current through said second control winding varying directly in proportion to the magnitude of the input signal over a second predetermined range.

3. In a bistable circuit, in combination; a magnetic amplifier having at least one saturable magnetic core having inductively disposed thereon a load winding, a feedback winding, a bias winding and a plurality of control windings; a load circuit connecting the output of said load winding to a load; a feedback circuit connecting a portion of the output from said load circuit to said feedback winding; a bias circuit connecting a bias supply to said bias winding; and an input network comprising first and second rectifying means, a constant reference voltage connected to bias said first rectifying means through a first control winding to forward conduction, said reference voltage also being connected to bias said second rectifying means to forward conduction, and means for applying a blocking input signal to said second rectifying means through a second control winding and to said first rectifying means; the magnitude of the current through said first control winding varying inversely in proportion to the magnitude of the input signal over a first predetermined range.

4. In a bistable circuit, in combination; a magnetic amplifier having at least one saturable magnetic core having inductively disposed thereon a load winding, a feedback winding, a bias winding and a plurality of control windings; a load circuit connecting the output of said load winding to a load; a feedback circuit connecting a portion of the output from said load circuit to said feedback winding; a bias circuit connecting a bias supply to said bias winding; and an input network comprising first and second rectifying means, a constant reference voltage connected to bias said first rectifying means through a first control winding to forward conduction, said reference voltage also being connected to bias said second rectifying means to forward conduction, and means for applying a blocking input signal to said second rectifying means through a second control winding and to said first rectifying means; the magnitude of the current through said first control winding varying inversely in proportion to the magnitude of the input signal over a first predetermined range; the magnitude of the current through said second control winding varying directly in proportion to the magnitude of the input signal over a second predetermined range.

References Cited in the file of this patent

UNITED STATES PATENTS

| | | |
|---|---|---|
| 2,807,006 | Collins et al. | Sept. 17, 1957 |
| 2,813,207 | Bonn | Nov. 12, 1957 |
| 2,827,573 | Eckert | Mar. 18, 1958 |
| 2,897,293 | Morgan et al. | July 28, 1959 |